United States Patent [19]

Lee

[11] 4,369,403

[45] Jan. 18, 1983

[54] POWER FACTOR CONTROLLER FOR INDUCTION MOTOR

[75] Inventor: Maw H. Lee, Broadview Heights, Ohio

[73] Assignee: The Scott & Fetzer Company, Cleveland, Ohio

[21] Appl. No.: 204,361

[22] PCT Filed: May 21, 1980

[86] PCT No.: PCT/US80/00604

§ 371 Date: Sep. 12, 1980

§ 102(e) Date: Sep. 12, 1980

[87] PCT Pub. No.: WO80/02895

PCT Pub. Date: Dec. 24, 1980

Related U.S. Application Data

[63] Continuation-in-part of Ser. No. 127,440, Mar. 5, 1980, abandoned, Continuation-in-part of Ser. No. 42,608, May 25, 1979, abandoned.

[51] Int. Cl.³ .............................................. H02P 5/40
[52] U.S. Cl. ............................... 318/729; 318/345 D; 318/812
[58] Field of Search .............. 318/729, 345 D, 345 H, 318/812

[56] References Cited

U.S. PATENT DOCUMENTS

| | | | |
|---|---|---|---|
| 3,525,916 | 8/1970 | Chodash | 318/345 H |
| 3,539,892 | 11/1970 | Lindberg | 318/345 H |
| 3,646,439 | 2/1972 | Broski | 323/902 |
| 3,875,485 | 4/1975 | Hornung | 318/345 H |
| 4,243,926 | 1/1981 | Phillips | 318/345 D |
| 4,266,177 | 5/1981 | Nola | 318/810 |

OTHER PUBLICATIONS

"Power Factor Controller", Tech. Support Package, NASA, George C. Marshall Space Flight Center, Summer 1977.

Primary Examiner—David Smith, Jr.
Attorney, Agent, or Firm—Pearne, Gordon, Sessions, McCoy & Granger

[57] ABSTRACT

An AC induction motor for driving a varying mechanical load is powered via a Triac switch electrically inserted in series with the motor and its AC supply. A low ohmic value resistor, also in series with the motor, continuously samples the load current. When the peak value of the sampled load current is below a predetermined value indicative of a near full load condition, the Triac is switched to a conducting state at a predetermined electrical angle from each immediately preceding trailing edge of the sampled load current pulses or of sampled line voltage pulses applied to the motor. Such a phase triggering switching scheme reduces the power applied to the motor by reducing the period of time that each half-cycle of the supply voltage is applied to the motor, which, in turn, advantageously reduces the losses caused by the reactive current in the less than fully loaded induction motor. At or near a full load condition, the Triac is held or latched in a conducting state to continuously apply full supply voltage to the motor.

5 Claims, 4 Drawing Figures

4,369,403

POWER FACTOR CONTROLLER FOR INDUCTION MOTOR

BACKGROUND OF THE INVENTION

This application is a continuation-in-part of continuation-in-part application Ser. No. 127,440, filed Mar. 5, 1980, now abandoned, which was a continuation-in-part of earlier-filed application Ser. No. 042,608, filed May 25, 1979, now abandoned.

The present invention relates to electronic controllers for motors adapted to drive varying or less than full mechanical loads, and more particularly, to control circuits for automatically reducing the power applied to a less than fully loaded AC induction motor, such reduced power application reducing losses caused by reactive current to improve the power factor of the induction motor.

U.S. Pat. No. 4,052,648 to Nola discloses an AC induction motor control circuit of the subject type which utilizes a phase-triggered thyristor means such as a Triac switch (Triac is a trademark of the General Electric Company of Syracuse, N.Y.) in series with an induction motor to vary the time of supply voltage application to the motor, on a half-cycle basis, the time of supply voltage application changing in direct proportion to the sensed motor power factor (a sensed decrease in motor power factor results in a decrease in the time of supply voltage application to inherently increase and optimize the motor power factor). Nola continuously senses the phase angle between the motor supply voltage and load current, and then uses a phase angle related signal to continuously adjust the firing point of the Triac switch relative to the zero crossing point of the supply voltage. For a sensed increasing phase angle (decreasing power factor) between motor supply voltage and load current, Nola shifts the Triac firing point away from the line voltage zero crossing point to apply a smaller portion of each half-cycle of the supply voltage, which inherently decreases the phase angle (increasing power factor) and reduces the heat loss ($I^2R$) caused by the reactive current.

While Nola recognizes the energy-saving advantages of duty cycle controlling an induction motor as a function of mechanical load with a series-inserted, phase-triggered, Triac switch, his phase angle measuring requirement and the resultant circuitry are undesirably complex and costly as compared to the relative simplicity and low cost of a small, single phase induction motor which exhibits the greatest need for reliable power factor regulation. Also, the Nola circuitry has been found to be unstable under certain operating conditions.

SUMMARY OF THE INVENTION

In accordance with the present invention, a solid state semiconductor AC switch, inserted in series with an AC induction motor and its AC supply, regulates the AC power applied to the motor. In one embodiment of the invention, current detecting means samples the alternating load current pulses through the motor for effective power factor control thereof without sensing the related motor voltage or supply voltage. In another embodiment of the invention, a voltage detecting means samples alternating supply voltage pulses applied to the motor, in addition to the sampling of the alternating load current pulses by the current detecting means. A control means responsive to the detecting means triggers the AC switch into a conducting state a predetermined time period (either fixed or variable as a function of load current) after the trailing edge of each detected load current pulse or of each detected line voltage pulse, at least when the peak value of the sensed load current pulses is less than a predetermined load current value indicative of a near full load condition experienced by the motor.

Preferably, the AC switch is a gate-controlled thyristor, such as a Triac switch, triggered relative to sampled trailing edges of load current pulses or of applied line voltage pulses. The sensed or detected trailing edge of each load current pulse or of each applied line voltage pulse is, in effect, delayed for a fixed time period, or, in the alternative, a load variable time period, and then applied to trigger the Triac switch, which results in the generation of the next load current pulse. The load variable time period in accordance with the invention is determined by the magnitude of load current through the motor as a function of time. Unlike Nola, the firing angle of the Triac, when varied in accordance with the invention, is a function of sensed load current magnitude and not a direct function of a phase angle measurement.

A start-up circuit and/or a full-load circuit independently hold or latch the Triac switch in a conducting condition to inhibit reduced power application to the motor when undesirable.

The control circuit in accordance with the present invention is very low in cost and has been found to be extremely reliable while providing significant reactive current reduction in induction motors.

DETAILED DESCRIPTION OF THE PREFERRED EMBODIMENTS

Figure 1:
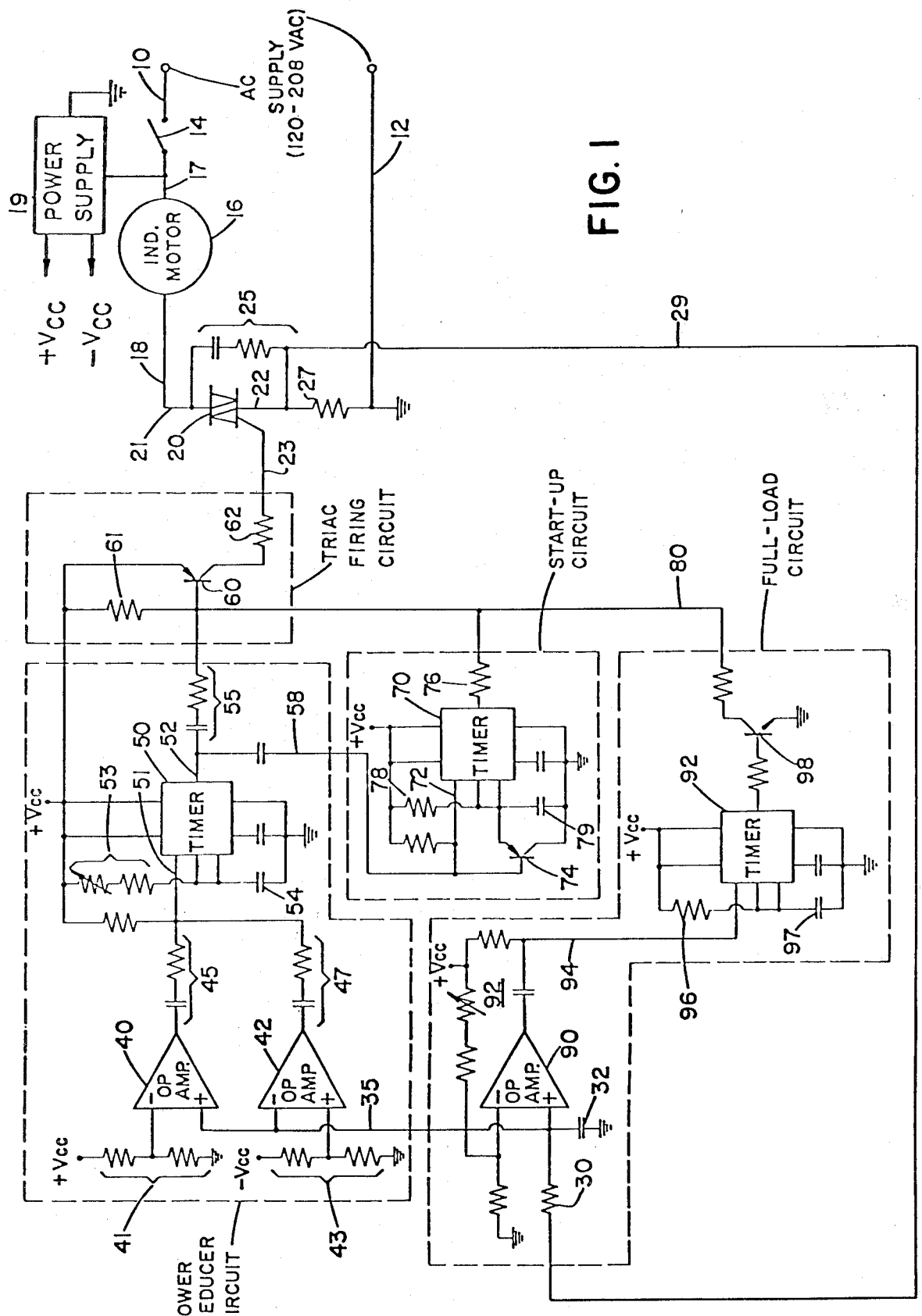
FIG. 1 is a schematic diagram of an induction motor control circuit in accordance with an embodiment of the present invention wherein a fixed firing angle from the trailing edge of the motor current for a motor energizing Triac switch is utilized.

In accordance with the present invention, and with particular reference to FIG. 1 of the drawings, there is illustrated a single phase AC supply, of, for example, 120 volts AC or 220 volts AC, provided by a pair of power lines 10, 12, the line 12 being illustrated as a grounded neutral or return line. The line 10 is electrically connected to one pole of a single pole on-off switch 14 having its other pole connected to provide power for a control electronics power supply 19 which provides appropriate positive and negative DC voltages ($+V_{cc}$, $-V_{cc}$) to the control electronics to be subsequently discussed.

A conventional single phase AC induction motor 16 of, for example, the split phase or capacitive start type, is powered via a pair of input leads 17, 18, one of the pair of input leads 17 being electrically connected to the other pole of the on-off switch 14 wherein closing of the switch 14 connects the line 10 to the induction motor 16. The other one of the pair of input leads 18 is electrically connected to the line 12 via a solid state semiconductor AC switch means, such as a thyristor, preferably in the form of a Triac switch 20 and a low ohmic value current sampling or detecting means resistor 27.

The Triac switch 20 is of conventional electrical configuration and includes a pair of power leads 21, 22, and a gate electrode 23, the power lead 21 being connected to the input lead 18 of the induction motor 16. The power lead 22 of the Triac switch 20 is connected to one end of the sampling resistor 27 having its other end connected for electrical grounding to the power line 12. It can be seen that the AC supply, provided across the power lines 10, 12, the induction motor 16, the Triac switch 20, and the current sampling resistor 27, are in electrical series relationship with each other to provide a substantially common load current path. A conventional RC snubber network 25 is connected in parallel across the Triac to provide effective Triac switching.

It can be seen that the induction motor 16 is fully powered by the AC supply voltage potential across power lines 10, 12 only when the AC switching means, Triac switch 20, is in a fully conducting condition, wherein the induction motor input lead 18 is connected to the power line 12 via the current sampling resistor 27, which is of a very low ohmic value, for example, 0.01 ohms, wherein virtually all supply voltage is dropped across the induction motor 16.

As is known in the art, if the Triac switch 20 is triggered into a conducting condition by an appropriate signal to its gate electrode 23 at least at each zero crossing point of the AC supply voltage, full voltage will be applied to the induction motor for maximum power application. On the other hand, shifting the firing point by electrical degrees away from the zero crossing point of the line voltage will inherently reduce the application time of each half-cycle of the line voltage to, in effect, reduce the over-all available power applied to the induction motor. Such a control technique is known in the art as "phase-triggering."

As illustrated in FIG. 1, appropriate Triac firing signals are applied to the Triac gate 23 by a Triac firing circuit which, in turn, is tripped or actuated via one of three circuits, namely, a power-reducing circuit, a start-up circuit, or a full-load circuit.

In accordance with the present invention, firing of the Triac switch 20 is closed-loop controlled by the load current sampled by resistor 27, such sampled load current being provided by a load current signal line 29 to a current sample buss 35 via a current sample limiting resistor 30, the buss 35 being connected to ground via a high frequency filter capacitor 32 which lessens the chance of false triggering signals on the buss 35. By way of example, and assuming that the Triac switch 20 is, in a conducting condition for at least a part of each half-cycle of the supply voltage, a sampled low current value AC signal (generally fundamentally sinusoidal, in the case of the usual commercial power AC supply) is applied to the buss 35, the sample current being formed of alternately changing direction or changing polarity current pulses. The buss 35 simultaneously provides the current sample pulses to the power-reducer circuit and the full-load circuit, as illustrated.

The current sample signal provided to the power reducer circuit is applied to the noninverting input of a positive pulse wave shaper operational amplifier 40 and to the inverting input of a negative pulse wave shaper operational amplifier 42. A positive threshold establishing resistor ladder 41 is connected to the inverting input of the wave shaper op amp 40, while a negative threshold establishing resistor ladder 43 is connected to the noninverting input of the wave shaping op amp 42. The outputs of the op amps 40, 42, provided via respective pulse differentiating RC coupling networks 45, 47, are tied together and applied to a timer input 51 of a trigger pulse signal delay timer 50. Type 741 operational amplifiers and a Type 555 timer, manufactured by the National Semiconductor Corporation of Santa Clara, California, have been found suitable for use as elements 40, 42 and 50 as discussed above.

In the case of alternating, near-sinusoidal current pulses applied by the buss 35, the op amps 40, 42 serve as conventional wave shapers to provide positive square-wave pulses each having generally equal widths less than the width of the base portion of the alternating input current pulses, the width of the square waves being conventionally determined by the values applied to the op amps 40,42 by the resistor ladders 41,43. The RC coupling networks 45,47 in turn provide positive and negative short-duration control pulses corresponding to the positive going and negative going edges of the square wave combined output signals of the op amps 40,42. The control pulses corresponding to the leading and trailing edges of the square wave signals provided by the wave shapers 40,42, corresponding to the alternating input current pulses provided by the buss 35, are fed to the input 51 of the timer 50, which, by conventional design, only responds to negative going pulses, i.e., the trailing edges of the input current pulses on the buss 35. It is the trailing edge of each induction motor current pulse that inherently shifts relative to the immediately preceding leading edge of the current pulse as a function of varying mechanical load on the motor. In effect, the shift of the load current pulse trailing edge is also relative to the trailing edge of the AC supply voltage to therefore effect power factor change. For a reducing mechanical load, the trailing edge shift is away from the immediately preceding leading edge, i.e., increased current lag. For an increasing mechanical load the trailing edge shift is toward the immediately preceding leading edge, i.e., decreased current lag. It is this inherent, load-sensitive shifting of the trailing edges that is utilized in accordance with the invention, as illustrated by FIG. 1 (and FIG. 3 to be discussed subsequently), to provide effective power factor control. When a negative pulse is applied to the input 51 of the timer 50, the output 52 of the timer 50 provides a positive going DC signal which reverts to its normal lower DC value after a fixed period of time determined by time constant resistors 53 and a time constant capacitor 54 connected to the timer 50 in a conventional manner, as illustrated. The timer 50, in effect, provides a delay (preferably substantially less than ½ hertz of AC supply) between a trailing edge indicative triggering signal at its input 51 and the negative going DC value at its output 52. While the predetermined time delay period provided by timer 50 is a fixed constant, FIGS. 3 and 4, to be subsequently discussed, illustrate means for providing a predetermined time period having a duration varying as a function of mechanical loading on the motor 16, such varying duration being a function of load current magnitude.

Thus, a Triac triggering pulse signal (negative going DC value) is provided by the output 52 of the timer 50 via a trigger pulse signal forming network 55 to the base of a gate control transistor 60 included within the Triac firing circuit. The emitter of the gate control transistor 60 is connected to the $+V_{cc}$ output of control supply 19 while a junction biasing resistor 61 is connected across the base and emitter of the transistor 60. The collector of the transistor 60 is directly connected via a gate current limiting resistor 62 to the Triac gate electrode 23. It can be seen that when the transistor 60 is switched on into a conducting condition by application of a negative going pulse signal to its base via the trigger pulse forming network 55, the gate of the Triac 23 is biased to switch on the Triac 20, which will continue to conduct after the gate signal is removed until the voltage across its power leads 21,22 is reduced to a near zero volt point wherein the Triac automatically recovers to an off condition with the help of the snubber circuit 25, such inherent characteristic of the Triac-type thyristor being well known in the art. While a Triac is illustrated in the preferred embodiment, it is to be understood that any solid state semiconductor AC switching means, such as a pair of back-to-back connected SCR thyristor switches, is contemplated for use by the inventor wherein such AC switching means turns off or recovers to a nonconducting condition generally at the trailing edge of a load current pulse, (i.e., when the current through the Triac switch drops below its "holding current") and remains in a nonconducting condition until an appropriate triggering signal or ON signal is applied to close or turn on the gate-controlled switching means.

It can be appreciated that holding the transistor 60 in a conducting condition by application of a continuous negative base signal will in turn continuously apply an ON signal to the gate 23 of the Triac 20, thus continuously holding or latching the Triac 20 in a fully conducting condition. Such a full conducting condtion of the Triac could also be maintained by providing an appropriate short duration triggering pulse to its gate only at the zero crossing points of the supply voltage. Under these conditions, full AC supply voltage will be continuously applied to the induction motor 16, assuming that the on-off switch 14 is in a closed condition. Under certain conditions which will now be discussed, it is desirable to latch the Triac switch 20 into a fully conducting condition for the application of all available supply voltage to the motor 16.

On closing of the switch 14 to start the induction motor 16, it is desirable that full supply voltage be provided by the AC supply across the induction motor 16 to start the motor and to overcome the inertia of the motor load. It is further desirable to latch the Triac 20 into a fully conducting condition until the induction motor reaches a near steady running condition. A start-up circuit as illustrated in FIG. 1 provides initial latching of the Triac switch 20 to start the motor 16 and overcome the inertia of the motor load. The start-up circuit is conventional in nature and functions as a missing pulse detector in that the absence of a signal on a start-up signal line 58 causes the start-up circuit to effectively bias the base of the transistor 60 at a low DC level to cause transistor conduction and in turn hold the Triac switch 20 in a conducting condition. The start-up signal line 58 is connected to the output 52 of the signal delay timer 50. Upon initial closing of the switch 14, the Triac switch 20 is in an open, nonconducting condition. No load current flows through the sampling resistor 27. No signal is present on the buss 35; thus no signal is present at the output 52 of the timer 50. Consequently, the lack of a signal at output 52 is sensed by the start-up circuit via start-up signal line 58, wherein a start timer 70 holds its start time output 76 at a low DC level to bias the base of the transistor 60 and turn it on. A type 555 timer, of the type earlier discussed, has been found suitable for use as element 70. The transistor 60 is now in a conducting condition, and latches the Triac switch 20 which remains in an ON condition for application of full supply voltage to the induction motor 16.

Current pulses are thus generated on the load current signal line 29, and the power reducer circuit begins to fully operate to provide a time delay triggering pulse signal at the delay timer output 52, which in turn is fed via start-up signal line 58 to the start-up timer input 72 and to an inhibit transistor 74. The timer 70 includes a conventional time constant resistor 78 and its related time constant capacitor 79. The collector and emitter of the transistor 74 are connected across the time constant capacitor 79, as illustrated, wherein switching on of the transistor 74 effectively shorts the time constant capacitor 79. When a pulse triggering signal is being impressed on the start-up signal line 58, the transistor 74 switches on and off in synchronism with the applied triggering pulse signal to periodically permit charging of the capacitor 79, the effect of which holds the timer output 76 at a high level opposed to that necessary for switching on and latching the transistor 60 in the Triac firing circuit, as earlier discussed. When the pulse triggering signal is not present (during start-up) on the start-up signal line 58, the lack of a signal on this line prevents capacitor 79 from being charged (transistor 74 continuously conducts), and thus the output 76 of the timer 70 becomes low, which in turn makes transistor 60 conduct to latch the Triac 20 in a fully conducting condition. It can be seen that the start-up circuit functions to temporarily hold the Triac switch 20 in a conducting condition (at least for ½ hertz of supply voltage) until the start-up circuit, upon detecting the operation of the power reducer circuit via start-up signal line 58, removes the latching signal from the base of the transistor 60 and, in a sense, allows the power reduction circuit to take over the gating of the Triac switch 20. It should be noted that while the power reducer circuit begins operating as the start-up circuit shuts down, preferably a full load circuit, to be subsequently discussed, overrides the power reducer circuit to supply full supply voltage to the motor until a steady state running condition is reached.

During the motor operation, the lack of at least a half-hertz of the applied supply voltage will shut down the operation of the power reducer circuit illustrated by the embodiment of FIG. 1, which in turn will shut down the motor operation. This is because the lack of a half-hertz of the applied voltage will result in a lack of current through the sampling resistor 27 for ½ hertz. In this case, the start-up circuit will again initiate power application, as described previously, to return the motor to an operating condition.

The effect of the power reducer circuit earlier discussed is to apply to the gate electrode 23 of the Triac switch 20 a triggering signal comprising turn-on pulses each of which is a predetermined time period away from the respective preceding trailing edge of the load current pulse provided to the power reducing circuit by the sampling resistor 27 via the load current signal line 29. The operation of the power reducer circuit will be further discussed subsequently with regard to FIG. 2.

While the power reducer circuit illustrated in FIG. 1 operates continuously (except during start-up or intermittent loss of supply voltage) to apply phase delayed triggering gate signals to the Triac switch 20 to reduce the application time of each half-cycle of the AC supply voltage by a fixed amount, such reduced power application is not desirable where the induction motor reaches a near full load condition or a less-than-full load condition (e.g., 50% of full load) predetermined by the user. To provide for the application of full power to the induction motor at near full load or other predetermined less-than-full load conditions, and when the motor is running up to full speed, a full load circuit is provided, which, like the earlier-discussed start-up circuit, functions to continuously apply appropriate gate drive to the transistor 60 to hold the Triac in a latched-on condition, for full power application of supply voltage to the induction motor 16.

The full load circuit includes as major elements a threshold current detect or peak current detect operational amplifier 90, a full load timer 92, and a latching transistor 98. A 741-type operational amplifier and a 555 timer, as discussed earlier, have been found suitable for use as element 90, 92, respectively. The threshold current op amp 90 is appropriately biased in a conventional manner at its inverting input via a closed-loop RC circuit 92. When the amplitude peak of the sampled load current pulses on the buss 35, applied to the noninverting input of the op amp 90, exceeds a predetermined value as established by the closed-loop circuit 92 that is indicative of a near full load condition or other predetermined load condition on the induction motor, or a surge current condition experienced during motor run-up to full speed, the op amp applies to a latch signal line 94 a pulse signal indicative of the detected full load condition. The full load indicative pulse signal is applied via line 94 to the input of the full load timer 92, which functions in a conventional manner, with time constant resistor 96 and capacitor 97, to switch its output to an appropriate low DC value for turning on the latching transistor 98, the output of the timer 92 driving the base of the transistor 98. The collector of the grounded emitter transistor 98 is tied to trigger line 80, wherein switching on the transistor 98 drives the base of the transistor 60 to latch the Triac switch 20 in a conducting condition, as earlier discussed with regard to the start-up circuit. With the Triac switch 20 latched in a conducting condition, full supply voltage is applied across the induction motor to provide maximum power output. The full load circuit thus applies full power to the motor upon start-up (high surge current) and at full load or another user-determined loading condition. As loading on the induction motor is decreased to below the predetermined load condition, the output of the threshold current detecting op amp 90 ceases, wherein the timer 92 is not retriggered and its output switches the transistor 98 to its normally off or nonconducting condition wherein the power reducer circuit in effect takes over sole control of the Triac switch 20. It can be seen that the full-load circuit detects changes in load current magnitude by detecting only the peak value of load current pulses relative to a predetermined threshold. When the peak value of the sampled load current is below the predetermined threshold, the AC switching means, Triac 20, is triggered by the power reducer into conduction for a predetermined fixed period of time less than the duration of each half-cycle of the AC supply. Conversely, when the peak value of the sampled load current exceeds the predetermined threshold value, the Triac 20 is triggered by the full-load circuit into conduction for a duration of time substantially equal to the duration of each half-cycle of the motor supply voltage. The power reducer circuit and the full-load circuit function as a control means that triggers the Triac switch into conduction for a predetermined period of time of each half-cycle of the AC supply, the duration of the predetermined time being dependent on the sensed magnitude of current through the motor, as indicated in general by peak amplitude detection as taught by FIG. 1. As used herein, "magnitude" indicates the average ampere value of a periodic current.

With reference to the waveform diagrams of FIG. 2, the operation of the circuit illustrated in FIG. 1, in accordance with the invention, will be discussed in greater detail.

By way of example, waveform 2a illustrates four cycles of commercial power sinusoidal voltage provided by the AC supply across power lines 10, 12 (FIG. 1).

Waveform 2b illustrates the load current through the motor when driving a full or near-full mechanical load. It can be seen that the peaks of the alternating direction or alternating polarity load current pulses exceed a predetermined near full load current value I control. As discussed earlier, excessive peak current value (at full load or during motor run-up) is detected by the full load circuit op amp 90, resulting in the latching of the Triac switch 20 in a fully conducting condition wherein full supply voltage is impressed across the motor for maximum mechanical power output. Under these full load conditions, the phase angle $\theta$ min is small.

Waveform 2c illustrates steady state load current through the motor at less than a near-full load condition and without the benefit of the power reducer circuit discussed earlier with regard to FIG. 1. As mechanical load on the motor is decreased, the peak value of the current pulse, indicative of load current magnitude, is decreased to less than the current value I control, wherein the full load circuit releases latching of the Triac 20 as earlier discussed. Assuming for purposes of illustration that the Triac 20 is made to fire at the zero crossing point of the supply voltage (full power), an excessive lagging current and large phase angle $\theta$ max will develop.

Waveform 2d illustrates load current through the motor and necessarily through sampling resistor 27 at less than near-full load with the power reducer circuit firing the Triac at a predetermined point in time subsequent to (and a predetermined electrical angle away from) the zero point of the supply voltage. When such firing of the Triac is effected, the load current diverges from a pure sinusoidal form, i.e., load current flows for less than a full half-cycle. The predetermined time period of delay between the zero crossing point of the line voltage and the firing of the Triac 20 is established by detecting at least a portion of the trailing edge of each load current pulse and then firing the Triac a predetermined time period from such detected portion of the trailing edge, a fixed predetermined time period being provided by the delay timer 50 discussed earlier with regard to FIG. 1.

The effect of such triggering is illustrated in waveform 2e. It can be seen that, with the power reducer circuit controlling Triac firing, only a portion, e.g., 85% of each half-cycle of the supply voltage, is applied to the induction motor. This time delay V delay is directly related to the delay period provided by the timer 50 between the detected trailing edge portion of each load current pulse and the subsequent generation of a delayed Triac triggering pulse. By phase triggering the Triac, the phase angle θ min (as shown by waveform 2d) is reduced considerably, when reduced power is applied to the less than fully loaded motor, thus inherently increasing the power factor.

Waveform 2f illustrates the output of the wave shaping op amp 40 of the power reducer circuit, while waveform 2g represents the output of the wave shaping op amp 42. It can be seen that each alternating direction current pulse generates a corresponding shorter duration positive square wave pulse having leading and trailing edges.

As illustrated by waveform 2i, each trailing edge of the square wave pulses in 2f and 2g corresponding to the trailing edge of the current pulses illustrated in waveform 2d, trips the timer input 52 (FIG. 1) to provide a negative going output signal after a time period I delay. It can be seen that this time period I delay is directly related to the time period V delay discussed earlier with regard to waveform 2e. The Triac triggering output signal from the delay timer 50 effectively triggers the Triac a predetermined time period after detecting the trailing edge of each load current pulse as sampled by the sampling resistor 27. The trailing edge of a positive polarity current pulse, in effect, triggers the Triac to provide the next negative polarity current pulse whose trailing edge, in turn, is used to trigger the Triac to provide the next positive polarity pulse. Such triggering correspondingly causes firing of the Triac at a point shifted subsequent in time away from the zero crossing point of the line voltage to effectively apply less than full half-cycle supply voltage to the less than fully loaded induction motor, thereby decreasing the phase angle between load voltage and load current to optimize the motor power factor.

Figure 2:
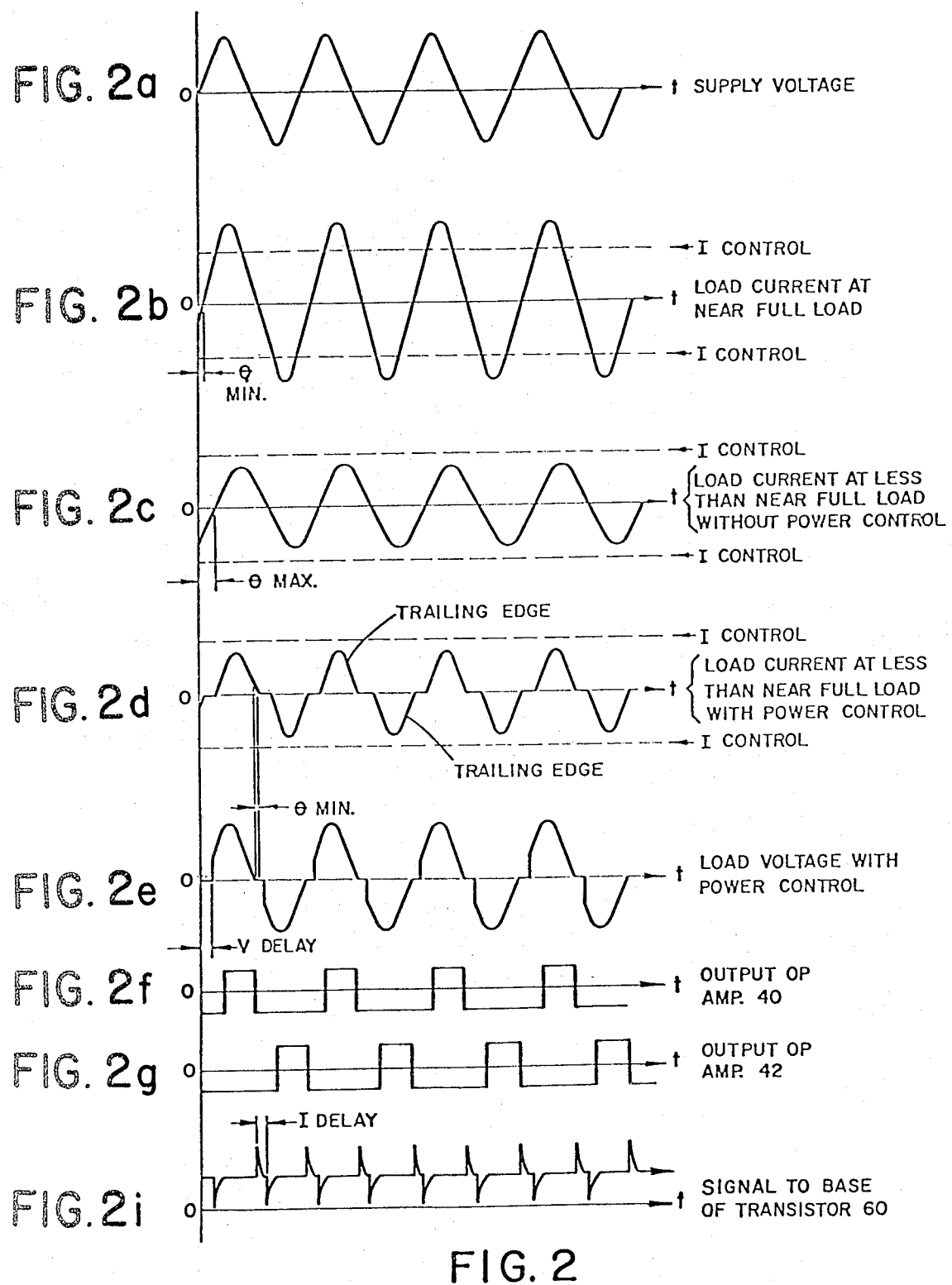
FIG. 2 is a waveform diagram of selected electrical signals provided by the motor control circuit of FIG. 1.

It should be noted that while the delay period of the timer 50 as illustrated by FIGS. 1 and 2 is illustrated as being fixed, a changing time period proportional to a varying mechanical load on the induction motor 16 could be utilized, as will be discussed with regard to FIGS. 3 and 4. It is also noted that while the circuit of FIG. 1 detects a changing magnitude of load current by detecting the peak values of current pulse, other techniques of measuring current magnitude and its changes as a function of time can be utilized for power factor control in accordance with load current magnitude as taught by the invention. For example, the circuits of FIGS. 3 and 4 to be subsequently discussed utilize a load current averaging technique. It is further contemplated that the present invention not only applies to single phase induction motors as here illustrated and discussed, but also applies to multiple-phase induction motors, wherein redundant control circuitry of the type illustrated would be provided for the multiple phases. It is further contemplated that the Triac triggering pulse time period provided by the delay timer 50 could be equal to a whole number multiple of the half-cycle period of the supply voltage plus the fixed phase delay period. For example, the trailing edge of a positive polarity load current pulse could be used to trigger the Triac to provide the next positive polarity load current pulse, while the trailing edge of a negative polarity load current pulse could be used to trigger the Triac to provide the next negative polarity current pulse.

Figure 3:
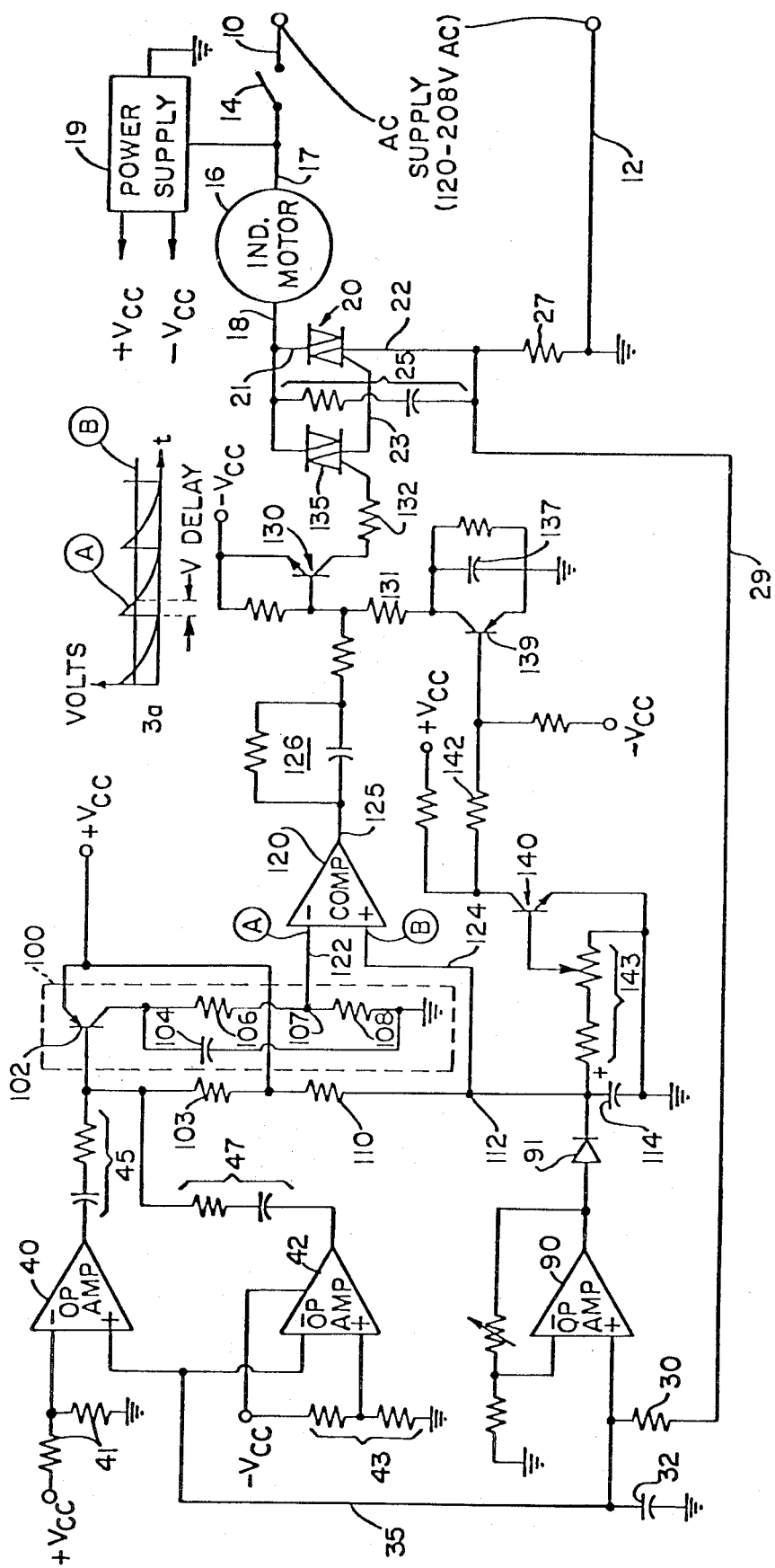
FIG. 3 is a schematic diagram of an induction motor control circuit in accordance with another embodiment of the present invention, wherein a variable firing angle for the motor energizing Triac switch is utilized.

Turning to FIG. 3, there is disclosed another embodiment of the invention utilizing load current sampling only wherein the Triac-firing related time delay angle, V delay, as illustrated and discussed earlier with regard to waveform 2e of FIG. 2, can be made to vary as a function of mechanical loading on the motor, in accordance with a sensed change in the magnitude of load current as a function of time. The circuit of FIG. 3 provides at least two features not provided by the circuit of FIG. 1 earlier discussed. Namely, the induction motor controlled by the circuit of FIG. 3 can respond more quickly to a changing mechanical load condition at less than a full load condition. Further, the FIG. 3 circuit continuously varies the power applied to the motor over a much wider range of mechanical loads on the motor. The amount of power (i.e., the applied portion of each half-cycle of the supply voltage) applied to the motor is continuously varied (at least over a range of light load conditions, such as 50% of full load or less) as a function of a corresponding varying mechanical load thereon. For purposes of clarity, circuit elements, previously illustrated and discussed with regard to FIG. 1, that appear in FIG. 3 carry like reference numerals.

As noted earlier, the induction motor 16 is powered via the phase triggered, series-inserted Triac switch 20. The amount of power applied to the induction motor 16 is dependent upon the time between the zero crossing of the supply voltage and the firing point of the Triac switch 20. In the circuit illustrated in FIG. 1, discussed earlier, reduced power application to the induction motor 16 in accordance with the present invention is accomplished by firing the Triac switch 20 into a conducting condition a fixed time period subsequent to the zero crossing point of the detected trailing edge of a sampled load current pulse. The circuit of FIG. 3 that will now be discussed does not utilize a fixed time delay angle or firing angle for triggering the Triac switch 20 into conduction under reduced power requirements. Rather, the time period between the zero crossing point of the sensed trailing edge of the associated lagging current pulse and the triggering of the Triac switch 20 on a half-cycle basis (120 Hz for 60 Hz commercial supply) is varied as a function of varying mechanical loading on the induction motor 16 as indicated by the varying magnitude of the load current pulses sensed by the sampling resistor 27. For a lightly loaded induction motor 16 with resultant low amplitude current pulses through the sampling resistor 27, the time between the zero crossing point of the trailing edges of load current pulses and the triggering point of the Triac switch 20 is maximized for reduced power application to the motor and resultant optimization of its power factor. For increasing mechanical loading on the induction motor 16, the resultant load current as sensed by the sampling resistor 27 increases in magnitude, such increase in magnitude being utilized by the control circuitry of FIG. 3 to lessen the general time period between the zero crossing point of the trailing edges of the load current pulses and the triggering of the Triac switch 20, wherein a larger portion, up to a full period of each half-cycle, of the supply voltage is supplied to the induction motor 16 to maintain its speed and required torque.

As in FIG. 1, and with particular reference to FIG. 3, the load current sensing signal line 29 provides, via the current sample limiting resistor 30, a sample signal of alternating load current pulses as illustrated in waveform 2d of FIG. 2, such sampled load current indicative pulses being carried on a current sample buss 35, the buss being connected to ground by the high frequency suppression capacitor 32 comprising a filter which removes from the buss 35 in a conventional manner potential false triggering signals.

Initially, the steady state operation of the circuit of FIG. 3 will be discussed wherein the motor 16 has run up to full speed and is not being mechanically loaded to a predetermined degree requiring full line voltage application. Under such conditions, it is desirable that less than full supply voltage be applied to the motor 16 to effectively optimize its power factor as discussed earlier with regard to the Nola patent. The load current sample signal provided on the buss 35 is applied to the wave-shaping op amps 40,42 having square wave generating outputs providing, via respective networks 45 and 47, a pulse signal indicative of the leading and trailing edges of each load current pulse on the buss 35.

With particular reference to FIG. 3, a saw-tooth signal generating circuit 100 is provided with the pulses generated by the op amps 40,42. The saw-tooth signal generating circuit 100 includes a trailing edge sensitive transistor 102, a junction-biasing resistor 103, a saw-tooth generating capacitor 104, a first voltage divider resistor 106, a second voltage divider resistor 108 and a voltage divider midpoint 107. The combined pulse outputs of the op amps 40,42, as modified by their respective differentiating networks 45 and 47, are applied to the base of the transistor 102. The transistor 102 is biased to respond only to negative-going pulses, that is, to those pulses corresponding generally in time to the trailing edges of load current pulses through the sampling resistor 27. The trailing edge sensitive transistor 102 will only turn on in response to the trailing edge of each sampled load current pulse on the buss 35. When the trailing edge sensitive resistor 102 does turn on, the saw-tooth generating capacitor 104 is rapidly charged to the full supply voltage ($+V_{cc}$) via the fully conducting transistor 102, the capacitor 104 being connected between electrical ground and the emitter of the transistor 102, as illustrated. When transistor 102 turns off, the saw-tooth generating capacitor 104 will discharge via the series-connected first voltage divider resistor 106 and second voltage divider resistor 108, such voltage divider resistor pair being connected in parallel across the capacitor 104 as illustrated. It can be seen that such a network will generate a saw-tooth voltage at the voltage divider midpoint 107, such midpoint voltage being provided via a saw-tooth signal line 122 to the inverting input of an operational amplifier 120 functioning as a comparator in a manner to be subsequently explained.

In further accordance with the invention, a delay time varying resistor 110 and a delay time varying capacitor 114 are connected in series with each other between the positive DC supply voltage ($+V_{cc}$) and electrical ground to constitute an RC network charged by the fixed supply voltage ($+V_{cc}$). An RC network midpoint 112, biased at a fixed DC voltage determined by the voltage divider network consisting of resistor 110 and a resistive network 143, is connected via a DC voltage signal line 124 to the noninverting input of the op amp 120. The DC voltage at the RC voltage midpoint 112 is made to vary from its DC bias by varying the charge (output of op amp 90) across the delay time varying capacitor 114, wherein the voltage at RC network midpoint 112 varies as a function of mechanical loading on the motor, such varying voltage establishing the time duration between the zero crossing point of the load current pulses and the firing of the Triac switch 20. This time duration establishment is accomplished by a "whistle-click" type control system illustrated graphically in waveform 3a of FIG. 3. The signal A at the inverting input of the op amp 120 is constituted by a saw-tooth signal generated by circuit 100 as earlier discussed. A leading generally vertically extending edge of the saw-tooth signal A is generated for each trailing edge of a load current pulse through the motor, as earlier discussed, when transistor 102 conducts. The trailing edge or decreasing ramp of the saw-tooth signal is dependent upon the values of the capacitor 104 and the discharging resistors 106 and 108. Such values provide a time constant wherein the capacitor 104 is fully discharged, or nearly fully discharged, as illustrated over a time period approximately equal to one-half cycle or less of the supply voltage.

The DC voltage (bias voltage plus change in voltage across capacitor 114) generated at RC network midpoint 112 and applied to the DC voltage signal line 124 is illustrated as signal B in waveform 3a. The op amp 120 functions in a known manner to provide an output in the form of a voltage level change (square wave) for the period of time that the saw-tooth signal A exceeds the level of the DC signal B. By varying the level of signal B from its DC bias point as a function of mechanical loading on the motor 16, the time duration of the square wave output signal of the op amp 120 will vary as a function of such mechanical loading on the motor. As further illustrated by waveform 3a, the firing angle time delay, V delay is thus determined. A Triac firing angle time delay determining output 125 is provided via a conventional differentiating coupling network 126 to the base of a turn-on transistor 130. The transistor 130 is biased in a conventional manner so as to respond only to a pulse provided by the coupling network 126 that indicates the trailing edge (time delay indicative portion) of the square wave output signal of the op amp 120. In response to a trailing edge indicative pulse from the network 126, the transistor 130 will conduct, for a very short time period necessary to fire into a conducting condition a turn-on thyristor 135 having its power lead connected between the motor power input lead 18 and the gate 23 of the Triac switch 20, wherein current is forced into or pulled out of the gate 23 of the motor-energizing Triac switch 20, depending upon the polarity of the supply voltage at the time of triggering, thereby triggering the Triac switch into a conducting condition for the remaining portion of a half-cycle of the supply voltage.

The manner of varying, as a function of motor loading, the DC level of signal B from its bias point at the noninverting input of the op amp 120 will now be discussed. Op amp 90 as illustrated in FIG. 1 is again used in FIG. 3 to amplify the sampled load current pulses on the buss 35. Every other amplified current pulse (e.g., positive polarity current pulses) is provided, via a charging diode 91, to the positive side of the delay time varying capacitor 114. It can be seen that the amount of charging current applied to the capacitor 114 is dependent upon the amplitude of load current pulses through the sampling resistor 27. For an increasing mechanical load on the induction motor 16, the current amplitude of pulses through sampler resistor 27 will increase, such increase resulting in additional charging current indicative of current magnitude being applied to the capacitor 114, wherein the level of DC voltage at midpoint 112, constituting signal B of waveform 3a, is increased. Such increased DC voltage effectively decreases the delay time, V delay, between the zero crossing point of the trailing edge of detected load current pulses and the triggering of the Triac switch 20, wherein more of each halfcycle of the supply voltage is applied to the induction motor 16 to maintain its speed and required torque under an increasing mechanical load.

Conversely, a decreasing load on the induction motor 16 will lower the amplitude of the current pulses through the sampling resistor 27, resulting in a decrease of the sensed magnitude of charging current being provided to the capacitor 114, wherein the DC voltage at the midpoint 112 (signal B) decreases (capacitor 114 discharging via network 143), resulting in an increase in the firing angle V delay to apply a smaller portion of each half-cycle of the supply voltage to the motor 16.

Thus, it can be seen that the circuit in FIG. 3, in accordance with the present invention effectively delays the firing of the Triac switch 20 for a predetermined time period subsequent to the time of the zero crossing point of the supply voltage, such predetermined time period varying in accordance with the degree of mechanical loading on the motor 16, as indicated by the detected changing magnitude of load current pulses therethrough. Whereas, the timer means 50 of FIG. 1 provided a fixed Triac firing time delay angle, the timer means of FIG. 3 provides a variable Triac firing time delay angle, the timer means of FIG. 3 being comprised of the saw-tooth generating circuit 100, the resistor 110, the capacitor 114, and the op amp 120 functioning as a comparator.

Like the circuit of FIG. 1, the circuit of FIG. 3 also provides means for motor start-up and run-up and for full supply voltage application to the motor under heavy mechanical loading thereon or other loading conditions predetermined by the user. Such a start-up circuit and a full load energizing circuit is constituted by a latching transistor 139 and a full load detect transistor 140. A full load indicating voltage dividing network constituted by a pair of resistors 143 is connected in parallel across the capacitor 114 to sense the voltage thereon (the resistor 143 also functions as a discharge path across capacitor 114 to effect variable charging of such capacitor by the charging diode 91, as noted above). The transistor 140 has its base connected to sense a portion of the voltage across the network 143, the transistor 140 switching to a conducting condition from its normally nonconducting state when the amplitude of the voltage applied to its base increases to a predetermined degree, i.e., when the charge across the capacitor 114 increases to a point indicative of a predetermined mechanical load on the motor 16. When the transistor 140 turns on, the latching transistor 139, whose base electrode is connected to the collector of transistor switch 140 via a current limiting resistor 142, turns on. With the latching transistor 139 in a fully conducting condition, the base of transistor 130 is effectively grounded via a resistor 131, wherein Triac switch 20 is energized via turned-on transistor 130 and latched in a fully conducting condition. When the voltage across the capacitor 114 decreases to a predetermined value wherein reduced power application to the motor is desired, the full load detect transistor 140 will be allowed to turn back off so as to preclude the application of a continuous turn-on signal to the base of the latch transistor 139.

To initially provide full start-up power to the induction motor 16, a motor start-up capacitor 137 parallelling the collector and emitter of the latching transistor 139 is provided. The capacitor 137 functions in a manner equivalent to the start-up timer 70 illustrated and discussed earlier with regard to FIG. 1. Upon closing of the switch 14, the capacitor 137 will appear momentarily as a short-circuit between the base of the transistor 130 and electrical ground via resistor 131. The resistor 131 and the capacitor 137 provide a sufficiently long time constant to allow the induction motor 16 to run up to full speed. When the induction motor 16 reaches full speed, the capacitor 137 will fully charge to isolate the base of the transistor 130 from electrical ground so as to turn it off. Now the transistor 130 is controlled via the output of op amp 120, as discussed earlier, until a heavy load on the induction motor 16 is experienced, wherein latch transistor 139 will override the control signals provided by the Triac firing delay determining output 125.

It can be seen that the control circuit illustrated and discussed with regard to FIG. 3, while operating in accordance with the general overall principles of the present invention as illustrated by FIG. 1, further provides a variable time delay between the firing of the Triac switch 20 and the zero crossing point of the trailing edges of the current pulses on a half-cycle basis to automatically apply varying degrees of more or less power to the motor 16, and thereby optimize its power factor over a range of reduced mechanical loads.

In accordance with the invention as illustrated by the circuits of FIGS. 1 and 3, a simple closed-loop induction motor control system is provided wherein only load current need be sampled to power the induction motor at either full power (for start-up, for run-up, and for maximum load driving) or at a predetermined degree (either fixed or varying as a function of load) of reduced power.

Figure 4:
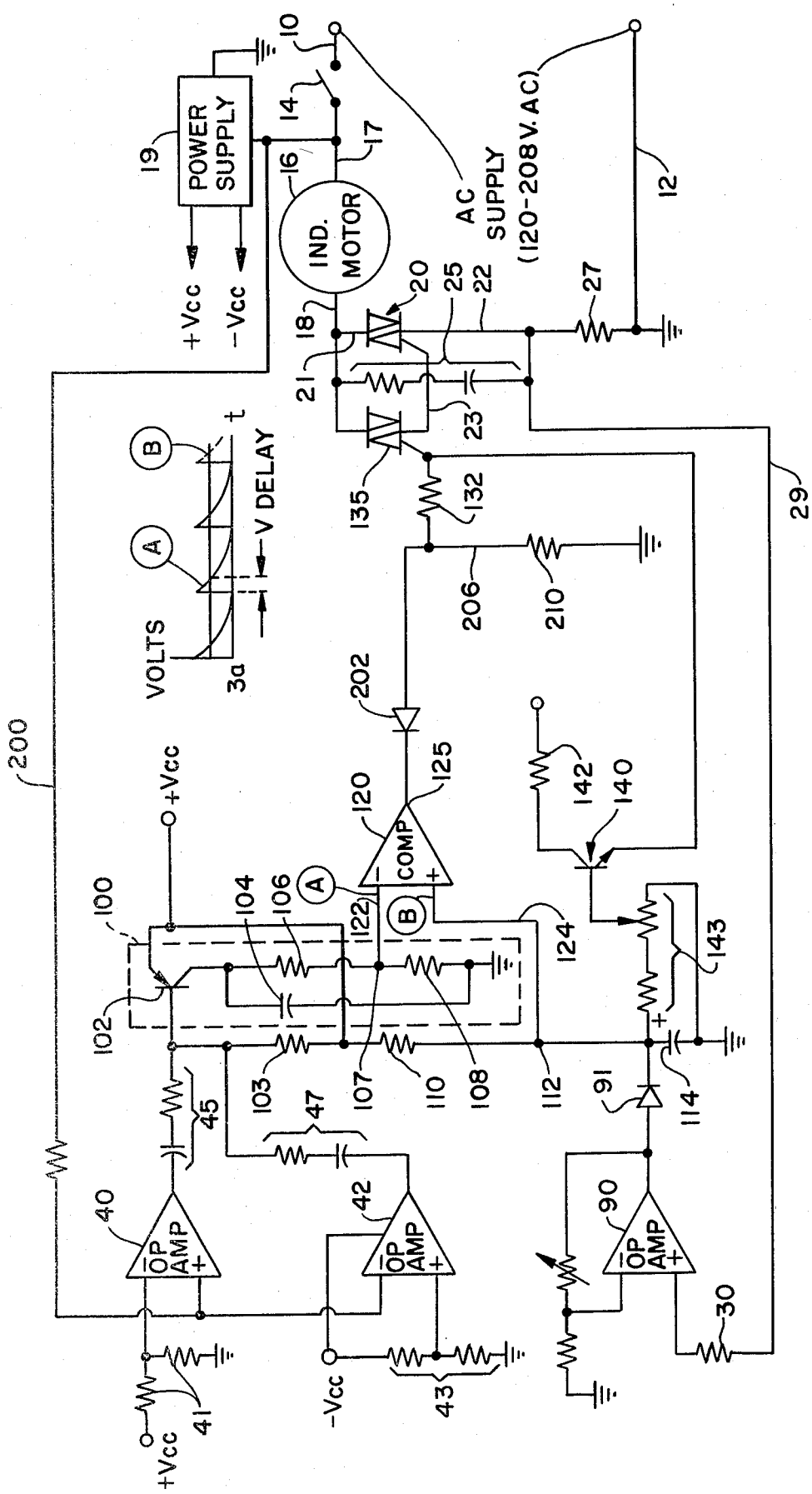
FIG. 4 is a schematic diagram of an induction motor control circuit in accordance with another embodiment of the present invention wherein the motor energizing Triac switch is triggered a predetermined time after the trailing edge of sensed supply voltage pulses applied to the motor as opposed to the embodiments of FIGS. 1 and 3 wherein only load current need be sampled for effective power factor control.

Turning to FIG. 4, there is illustrated another embodiment of the present invention similar in construction and operation to the embodiment illustrated and discussed with regard to FIG. 3. For purposes of clarity, elements corresponding generally in construction and operation to elements of FIGS. 1 and 3 carry like reference numerals.

The circuit of FIG. 4, unlike those of FIGS. 1 and 3, does not require a separate start-up circuit. Further, the loss of a current pulse for any reason, will not hamper the continued operation of a FIG. 4 circuit.

The embodiment of FIG. 4 differs from that of FIG. 3 in that the saw-tooth signal A is generated by sampling the supply voltage of the motor as opposed to utilizing the sensed load current pulses therethrough. Such a circuit precludes the need for a separate start-up circuit, such circuit being deleted from the embodiment of FIG. 4, since the supply voltage is immediately available to the motor control circuitry upon the closing of switch 14, regardless of current flow through the motor.

In FIG. 4, a supply voltage sensing signal line 200 is provided to sense the alternating supply voltage pulse and input therein to the noninverting output of op amp 40 and the inverting input of op amp 42. The saw-tooth wave generating circuit 100, the op amps 40,42, and the networks 45,47 cooperate to generate the saw-tooth signal A in accordance with the earlier-discussed operation of the circuit of FIG. 3. With reference to signal A, the leading edge of each saw-tooth wave corresponds in time to a trailing edge portion of each polarity pulse of the supply voltage. The signal B is generated as heretofore discussed with regard to FIG. 3, since the current sampling line 29 functions to provide a current magnitude indicative signal to the op amp 90, which affects the charging rate of the capacitor 114, as earlier discussed, to vary the DC level of signal B relative to the DC bias provided by resistor 110 and resistive network 143. This DC bias level has been found desirable to maintain stability in the circuitry, this DC bias feature to be discussed in detail subsequently. The transistor 140, discussed earlier with regard to FIG. 3, operates to provide a latch signal which is connected to the triggering load of the Triac 135.

Upon switching of the transistor 140 to a fully conducting condition, the Triac 20, via Triac 135, switches to a continuously or latched conducting condition as discussed earlier with regard to FIG. 3.

It can be seen that the circuit of FIG. 4 operates generally in accordance with the teachings of the circuit configuration of FIG. 3, but for the sampling of line voltage as opposed to load current to generate the sawtooth signal A and but for the deletion of a start-up circuit.

With regard to the circuits of FIGS. 3 and 4, which, below a predetermined current magnitude (full load), continuously reduce or increase the firing angle of the Triac 20 in accordance with a corresponding reduction or increase in the magnitude of the load current, it has been found desirable from a circuit stability standpoint to provide a constant DC bias voltage on the noninverting input of the comparator 120. Such a fixed DC level provides a reference point relative to which the mechanical load indicative DC voltage (output of op amp 90) provided across capacitor 114 can vary. The proper DC bias assures that the Triac 20 will conduct for at least a small portion of each half-cycle of the supply voltage to ensure rotation of the motor to at least a limited degree.

In the course of conceiving and reducing to practice applicant's present invention as heretofore described, experimentation with the circuit of Nola (as illustrated by U.S. Pat. No. 4,052,648, such patent being incorporated herein in its entirety by reference) indicated instability in its operation, apparently due to the lack of a fixed DC reference voltage at the integrator controlled input of the Nola comparator 102. Therefore, further in accordance with the present invention, an improvement of the Nola invention is provided for enhanced stability of the Nola circuit wherein a fixed DC bias is provided at the output of the Nola integratory 70, and hence to the control input of the comparator 120.

Such a reference bias could, for example, be provided by a voltage divider network connected between Nola's control electronics power supply $+V_{cc}$ and electrical ground. Such a voltage network is illustrated in applicant's FIGS. 3 and 4, as discussed with regard to resistors 110 and resistor network 143. It was the discovery of the stabilizing effect of the DC bias voltage in the circuits of FIGS. 1, 3, and 4 of the present invention that resulted in the improved Nola circuit. It is recognized that the improved stability of providing a fixed DC bias as a part of the control signal to Nola's comparator 120 enhances stability of the Nola circuitry, such improvement being hereafter claimed by applicant as his invention.

While preferred forms of this invention have been specifically illustrated and described herein, it will be apparent to those skilled in the art that modifications and improvements may be made to the forms herein specifically disclosed. Accordingly, the present invention is not to be limited to the forms herein specifically disclosed or in any other way inconsistent with the progress in the art promoted by this invention.

What is claimed is:

1. An electronic controller for regulating the power applied by an AC supply to an AC induction motor, comprising:

a semiconductor AC switching means inserted in series with the AC supply and the induction motor, power being applied to the induction motor via the switching means;

means for detecting at least a portion of each trailing edge of load current pulses through the induction motor when the switching means is in a conducting state;

means for detecting the magnitude of current through the motor when the switching means is in a conducting condition, the magnitude of current changing in response to a changing mechanical load on the motor; and a power-reducing circuit responsive to each of the detected trailing edge portions for triggering the switching means into a conducting state a predetermined time period after each detected trailing edge of the load current pulses when the peak value of the load current pulses is less than a predetermined load current value indicative of a near full load condition, said triggering being independent of the trailing edges of associated motor voltage pulses.

2. An electronic controller for regulating the power applied by an AC supply to an AC induction motor, comprising:

a Triac semiconductor switch having a pair of power leads and a gate electrode, one of the power leads being electrically connected to the induction motor, the other power lead being electrically connected to the AC supply, power to the induction motor being applied via the leads, the leads being in electrical series relationship with the AC supply and the motor;

a low ohmic value current sampling resistor inserted in electrical series relationship with the motor to continuously sample alternating direction load current pulses flowing through the motor when the Triac switch is in a conducting state;

a trailing edge detecting circuit electrically connected to the sampling resistor, the detecting circuit supplying a control pulse generally concurrently with each trailing edge of the sampled load current pulses;

a variable time delay circuit having inputs connected to the detecting circuit and the current sampling resistor, the time delay circuit having an output, the output providing a Triac triggering pulse a period of time after a control pulse is applied to one input of the time delay circuit, the duration of said period of time varying in inverse proportion to the magnitude of the load current sample provided by the low ohmic value resistor to the other input of the time delay circuit; and a Triac firing circuit connected between the output of the time delay circuit and the gate electrode of the Triac switch, the firing circuit being responsive to the Triac triggering pulse, the firing circuit applying to the gate electrode a firing pulse for each Triac triggering pulse provided by the time delay circuit, the firing pulse switching the Triac switch to a conducting condition, said applying being independent of the trailing edges of associated motor voltage pulses.

3. An electronic controller for regulating power applied by an AC supply to an induction motor comprising:

a semiconductor AC switching means inserted in series with the AC supply and the induction motor, power being applied to the motor via the thyristor switch;

means for detecting at least a portion of each trailing edge of alternating polarity voltage pulses provided by the supply and available for powering the motor when a thyristor switch is in a conducting condition;

means for detecting the magnitude of current through the motor when the switching means is in a conducting condition, the magnitude of current changing in response to a changing mechanical load on the motor; and a power reducing circuit responsive to each of the detected trailing edge portions for triggering the thyristor switch into conduction a predetermined time period after each trailing edge portion of the voltage pulses when the peak value of the load current pulses is less than a predetermined load current value indicative of a near full load condition, said triggering being independent of the trailing edges of associated motor load current pulses.

4. A controller according to claim 1 or 3, wherein the time period continuously increases upon a continual decrease in mechanical loading on the motor, a decrease in load current through the motor, indicative of a decreasing mechanical load thereon, being sensed by the power reducing circuit, the power reducing circuit in response to the sensed increasing load current decreasing the time period.

5. An electronic controller for regulating the power applied by an AC supply to an AC induction motor, comprising:

a Triac semiconductor switch having a pair of power leads and a gate electrode, one of the power leads being electrically connected to the induction motor, the other power lead being electrically connected to the AC supply, power to the induction motor being applied via the leads, the leads being in electrical series relationship with the AC supply and the motor;

a low ohmic value current sampling resistor inserted in electrical series relationship with the motor to continuously sample alternating direction load current pulses flowing through the motor when the Triac switch is in a conducting state;

a trailing edge detecting circuit electrically connected to sense the AC supply voltage pulse, the detecting circuit supplying a control pulse generally concurrently with each trailing edge of the sampled AC supply voltage pulses;

a variable time delay circuit having inputs connected to the detecting circuit and the current sampling resistor, the time delay circuit having an output, the output providing a Triac triggering pulse a period of time after a control pulse is applied to one input of the time delay circuit, the duration of said period of time varying in inverse proportion to the magnitude of the load current sample provided by the low ohmic value resistor to the other input of the time delay circuit; and a Triac firing circuit connected between the output of the time delay circuit and the gate electrode of the Triac switch, the firing circuit being responsive to the Triac triggering pulse, the firing circuit applying to the gate electrode a firing pulse for each Triac triggering pulse provided by the time delay circuit, the firing pulse switching the Triac switch to a conducting condition, said applying being independent of the trailing edges of associated motor load current pulses.

* * * * *